UNITED STATES PATENT OFFICE.

FRITZ KLEEMANN, OF SCHÖNINGEN, BRUNSWICK, GERMANY.

PROCESS OF AND MEANS FOR FILTERING AND DECOLORIZING SUGAR-LIQUORS, SIRUPS, AND SACCHARINE JUICES.

SPECIFICATION forming part of Letters Patent No. 302,739, dated July 29, 1884.

Application filed February 12, 1884. (No specimens.)

*To all whom it may concern:*

Be it known that I, FRITZ KLEEMANN, of the city of Schöningen, Duchy of Brunswick, German Empire, have invented certain new and useful Improved Processes of and Means for Filtering and Decolorizing Sugar-Liquors, Sirups, and Saccharine Juices, of which the following is a specification.

The operation of separating and removing from sugar-liquors, sirups, and saccharine juices the slimy or mucilaginous matters and impurities contained in them has hitherto been attended with considerable difficulty, and that of removing the coloring-matter from such liquids has always involved the use of very expensive decolorizing agents. These operations I effect, according to my invention, in a simple, effective, and inexpensive manner by using, as an absorbing medium or as a filtering medium, peat, or the substance known as "brown coal," "tertiary coal," or "lignite," and employing a process of treatment which may be carried out in either of two ways, as follows: First, I add to or mix with the sugar-liquor, sirup, or saccharine juice, before filtration, a suitable proportion of the brown coal, or of the peat, in a crushed, ground, broken, or pulverulent state, and then filter the liquid in any of the well-known ways, but preferably by the use of filter-presses; or, second, I place a quantity of the broken or pulverulent brown coal or of the peat in any suitable vessel, and cause the sugar-liquor, sirup, or saccharine juice to pass through the material within the vessel. In the first case the broken or pulverulent material absorbs or retains the slimy or mucilaginous matters and other impurities contained in the liquor, as well as a large proportion of the coloring-matter, and the purified liquor passes freely through the filter-cloth or other filtering medium employed. The second method is more particularly adapted for effecting the decolorization of liquor which has previously been filtered; but it is also applicable for effecting at one operation both the separation of the slimy impurities and the removal of the coloring-matter from the liquor. The process of treatment by means of brown coal or of peat has also the effect of removing from certain classes of sugar-liquors the offensive odor and unpalatable taste they ordinarily possess.

The broken or pulverulent brown coal or peat employed in the process described may be used separately or in combination, or in admixture with vegetable charcoal. The brown coal or peat may also be employed in a coarsely-broken state to effect the decolorization, as above described, of liquors which have previously been filtered, and be afterward washed with water and more finely ground or crushed and dried, and subsequently added to or mixed with unfiltered liquor, to effect the separation and removal of the slimy or mucilaginous and other impurities.

What I claim is—

1. The herein-described process of treating sugar-liquors, sirups, and saccharine juices to facilitate filtration and decolorization, said process consisting in subjecting the liquor to the action of brown coal, tertiary coal, lignite, or peat, substantially as set forth.

2. The herein-described process of filtering and decolorizing sugar-liquors, sirups, and saccharine juices, said process consisting in first adding to or mixing with the liquor broken or pulverulent brown coal, tertiary coal, lignite, or peat, and then passing the liquor through the usual filtering device, substantially as set forth.

3. As a new filtering and decolorizing medium for treating sugar-liquors, sirups, and saccharine juices, the herein-described broken or pulverulent brown coal, tertiary coal, lignite, or peat, as set forth.

In testimony that I claim the foregoing as my invention I have signed my name in presence of two subscribing witnesses.

FRITZ KLEEMANN.

Witnesses:
  B. ROI,
  ALEX SCHOLZE.